United States Patent
Xu et al.

(10) Patent No.: US 11,385,159 B2
(45) Date of Patent: Jul. 12, 2022

(54) SUPERGRAVITY SIMULATION SYSTEM FOR IN-SITU STRESS FIELD AND SEEPAGE FIELD OF DEEP EARTH ENGINEERING

(71) Applicant: ZHEJIANG UNIVERSITY, Hangzhou (CN)

(72) Inventors: Wenjie Xu, Hangzhou (CN); Liangtong Zhan, Hangzhou (CN); Yunmin Chen, Hangzhou (CN); Ke Li, Hangzhou (CN); Jinlong Li, Hangzhou (CN)

(*) Notice: Subject to any disclaimer, the term of this patent is extended or adjusted under 35 U.S.C. 154(b) by 0 days.

(21) Appl. No.: 17/544,966

(22) Filed: Dec. 8, 2021

(65) Prior Publication Data
US 2022/0091012 A1 Mar. 24, 2022

Related U.S. Application Data

(63) Continuation of application No. PCT/CN2020/098292, filed on Jun. 24, 2020.

(30) Foreign Application Priority Data

Jun. 27, 2019 (CN) .......................... 201910569723.6

(51) Int. Cl.
  *G01N 15/08* (2006.01)
  *E02D 1/02* (2006.01)
(52) U.S. Cl.
  CPC ......... *G01N 15/0806* (2013.01); *E02D 1/025* (2013.01); *E02D 1/027* (2013.01)
(58) Field of Classification Search
  CPC combination set(s) only.
  See application file for complete search history.

(56) References Cited

U.S. PATENT DOCUMENTS

2005/0150273 A1   7/2005  Potter
2020/0340973 A1*  10/2020 Hakimuddin .......... G01N 11/00

FOREIGN PATENT DOCUMENTS

| CN | 203376239 U | 1/2014 |
| CN | 104749044 A | 4/2015 |
| CN | 107063882 A | 8/2017 |

(Continued)

OTHER PUBLICATIONS

First Examination Report and Search Report of CNIPA.
Notice of Allowance from CNIPA and Allowed Claims.

*Primary Examiner* — Kyle Armstrong

(57) ABSTRACT

The present disclosure provides a supergravity simulation system for in-situ stress field and seepage field for deep earth engineering, comprising: a triaxial pressure chamber for placing a model and providing in-situ axial pressure, confining pressure and seepage field of deep earth structure; a simulation control device for providing pressure liquid and pore water to the triaxial pressure chamber to generate the aforementioned axial pressure, confining pressure and seepage field, and controlling the values of the axial pressure, confining pressure and seepage field; a signal acquisition device for monitoring the deformation and seepage process of the model during the test. The invention improves the similarity, reliability, and accuracy of the simulation test, and it can output pressure with an accuracy of 1% or constitute the pore water pressure difference with an accuracy of 1% to the triaxial pressure chamber through the command of the control unit.

14 Claims, 4 Drawing Sheets

(56) References Cited

FOREIGN PATENT DOCUMENTS

| | | | |
|---|---|---|---|
| CN | 109632509 A | | 4/2019 |
| CN | 109682688 A | | 4/2019 |
| CN | 110593239 A | | 12/2019 |
| CN | 112781976 A | * | 5/2021 |
| EP | 2602607 A3 | | 6/2017 |
| KR | 101683619 B1 | | 12/2016 |

* cited by examiner

SUPERGRAVITY SIMULATION SYSTEM FOR IN-SITU STRESS FIELD AND SEEPAGE FIELD OF DEEP EARTH ENGINEERING

CROSS REFERENCE OF RELATED APPLICATIONS

This application is a continuation of PCT patent Application No. PCT/CN2020/098292, filed on 24 Jun. 2020, entitled "Supergravity Simulation System for In-situ Stress Filed and Speepage Field of Deep Earth Engineering," which claims foreign priority of Chinese Patent Application No. 201910569723.6, filed 27 Jun. 2019 in the China National Intellectual Property Administration (CNIPA), the entire contents of which are hereby incorporated by reference in their entireties.

TECHNICAL FIELD

The present disclosure relates to physical simulation test system in the field of geotechnical engineering, specifically, to a supergravity simulation system for in-situ stress field and seepage field of deep earth engineering.

BACKGROUND

Deep earth engineering refers to the engineering process that occurs during the construction process of deep earth structures and their operation in deep earth environment. Common deep earth structures can be deep earth repositories, geothermal engineering, cavernous natural gas storage, etc.

In the above content, deep earth environment refers to an environment with a depth of more than one hundred meters from the ground surface.

The in-situ stress field and seepage field of deep structures have the following five characteristics at the same time: (1) the overburden pressure (axial pressure) of deep structure is relatively large, which can reach 20 MPa at a depth of kilometer; (2) the confining pressure of deep structure is relatively large, which can reach 20 MPa at a depth of kilometer; (3) the size of deep structures is usually on the scale of hundred meters, and the self-weight stress and confining pressure vary along the height of the deep structure, and therefore the self-weight stress gradient and the confining pressure gradient are formed; (4) the stress field and seepage field of deep structures are coupled with each other, in which the engineering process is very complicated, and the changes of deformation, stress, saturation and other related parameters are difficult to be described by mathematical models and more dependent experiments; (5) the changes of stress field and seepage field are slow and long, and the changes of the above-mentioned parameters will not be stable until a century or even a millennium. In the above content, in-situ refers to a measurement of a certain parameter without changing the original conditions of the substance or isolating the substance from the original system. Prototype refers to a physical object in the original system, and in the present disclosure, it refers to a deep earth structure in a deep earth environment; model refers to a physical object made to the scale-down size (or the enlarged size or the same size) of the original system according to the theory of similarity. The in-situ stress field and seepage field are the stress field and seepage field of the prototype.

Other research objects of geotechnical engineering do not have the above five characteristics at the same time, so they are essentially different from deep earth engineering.

In order to determine the changes of deformation, stress, saturation and other related parameters in deep earth engineering, tests are required. The test is divided into in-situ test and simulation test. In-situ test refers to the test carried out in situ, such as setting up instruments in an existing deep earth repository for measurement. When conducting in-situ tests of deep earth engineering, on the one hand, testers need to carry equipment to work in the deep earth environment. On the other hand, some of the test objects are national engineering equipment that is still in service, so the in-situ test lacks time flexibility and operational convenience. In addition, as the aforementioned characteristic (5) of the stress field and seepage field of deep earth engineering, the complete measurement of parameter changes requires a test time on the scale of a century or even a millennium, which is much larger than the time scale involved in social or technological activities in the general sense.

Therefore, physical simulation tests performed in a laboratory are preferred. A physical simulation test refers to the simulation test in which the model is a physical object, for example, a 1 m high model is used in the laboratory to replace a 100 m high deep earth repository prototype, and a pressure device is used to apply pressure on its top, bottom and sides. Hereinafter, a physical simulation test will be referred to as a simulation test for short. The simulation test is performed by placing the model inside the test apparatus and then applying force and/or passing pore water through the test apparatus into the surface of the model to generate a stress field and/or a seepage field in the model. When the applied force and/or the pore water flow rate meets specific requirements, an in-situ stress field and/or seepage field can be generated. Taking into account the size constraints of laboratory sites, the simulations of deep earth engineering are usually performed using models with scales less than 10 meters. Other geotechnical engineering does not have the five characteristics of deep earth engineering at the same time, so the models used for simulations of other geotechnical engineering do not have to meet the above five conditions at the same time.

As mentioned earlier, in the simulation test, the axial pressure of the top and bottom of the model is a certain value and is easy to apply. The confining pressure of the model is usually applied by squeezing the model around the pressure fluid on the sides of the model. The confining pressure at the top of the model is the set pressure of the device, and the confining pressure at the bottom of the model is the sum of the confining pressure at the top and the self-weight of pressure liquid at the bottom. Because the density of the pressure liquid is usually smaller than that of the rock, and the height of the model is small, the self-weight of the pressure liquid at the bottom of the model is negligibly small, so that it is not possible to form a confining pressure gradient similar to that of the prototype. The self-weight stress of the model is related to the scale of the model, but usually the scale of the model for simulation tests is less than 10 meters, so the difference between the self-weight stress at the top and the bottom is only $\frac{1}{10}$ of that of the prototype. The simulation of the seepage field is usually formed by injecting pore water into the model. Since the stress field of the model is different from that of the prototype, the resulting seepage field is also different from that of the prototype. In summary, the simulation tests of deep earth engineering cannot reproduce the in-situ seepage field and stress field.

Where, the stress field is a general description of the instantaneous stress state of all points in the object. The stress state refers to the stress of a point in an object in all possible directions. Stress refers to the internal force produced by the interaction between various parts of the object when the object is deformed due to external factors (forces, humidity, temperature field changes, etc.). The function of stress is to resist the action of such external factors and to try to restore the object from its deformed position to its pre-deformed position.

Where, the seepage field is a general description of the fluid pressure at all points inside rock and soil. Seepage refers to the flow of pore water in the medium. In continuous rock and soil, seepage occurs when two points have different pore water pressures. In deep earth engineering, the common form of seepage is the flow of groundwater in rocks or deep earth engineering structures or the flow between the two of them. Pore water pressure refers to the pressure generated by pore water. Pore water refers to the liquid that exists in the pores of rock and soil, which is usually water or other liquids.

Where, the overburden pressure refers to the pressure caused by the weight of rock and soil overlying the research object, which is vertical and downward, and the value increases linearly with the depth. Axial pressure refers to the pressure which is perpendicular to the section and points to the inside of the section. In the simulation test system, the axial pressure of deep earth engineering refers to the overburden pressure at the top and bottom of the model.

Where, confining pressure refers to the pressure exerted by the surrounding rock and soil on the research object within the rock and soil, with the direction horizontal and perpendicular to the contact surface pointing into the object. The confining pressure in a deep earth environment is mainly caused by the pressure of overburden pressure, the value of which is generally considered to be equal to the pressure of overburden pressure and increase linearly with the depth.

Where, self-weight stress is the stress caused by the own weight of rock and soil. The self-weight stress in the vertical direction at any point in the rock and soil is equal to the mass of the rock and soil column per unit area above the point.

In order to explain the difference more concretely, a set of stress field simulations of a prototype and model are taken as an example. The prototype is a 100 m high rock with a depth of 1000 meters, and the weight of surrounding rock and rock is 25 kN/m3. The isotropic pressure to which it is subjected is shown in FIG. 1: the top axial pressure is 25 MPa, the bottom axial pressure is 27.5 MPa, the top confining pressure is 25 MPa, the bottom confining pressure is 27.5 MPa, the difference between the top and the bottom of self-weight stress is 2.5 MPa, and the fluid pressure is related to the flow and distribution of groundwater. The model is a 1 m high rock with a weight of 25 kN/m3. The top axial pressure and the top confining pressure applied to the model are 25 MPa and 25 MPa respectively. The pressure liquid of the confining pressure is oil with a weight of 8 kN/m3. The isotropic pressure to which it is subjected is shown in FIG. 2: the axial pressure at the bottom of the model is the sum of the top axial pressure and the weight of the model, which is 25.025 MPa, and the confining pressure at the bottom is the sum of the top confining pressure and the weight of the oil, which is 25.008 MPa. The difference between the top and the bottom of the model is 0.025 MPa. Obviously, the stress field of the model is quite different from that of the prototype.

In conclusion, although the simulation test of deep earth engineering has the advantages of convenient operation and flexible time arrangement, it still has the disadvantages of limited simulation time scale and the inability to fully reproduce the confining pressure gradient and the self-weight stress gradient. Under the normal gravity, there is no way to simulate the stress field and seepage field of deep earth engineering.

SUMMARY

In order to overcome the shortcomings of limited simulation time scale and inability to completely reproduce the in-situ stress field and seepage field in the prior art, the present disclosure aims to provide a supergravity simulation system for in-situ stress field and seepage field of deep earth engineering, which can simultaneously provide high confining pressure and high stress in simulation test, and can simulate the in-situ confining pressure and self-weight stress gradient, to realistically reproduce the in-situ stress field and seepage field of deep earth structures, so that the test results can reflect the prototype situation more reliably and accurately.

In order to achieve the above purposes, the technical solution adopted by the present disclosure is as follows.

A supergravity simulation system for in-situ stress field and seepage field of deep earth engineering, comprising:

a triaxial pressure chamber, which is used for placing the model, and providing the in-situ axial pressure and confining pressure of deep earth structure and the seepage field in which it is located;

a simulation control device, which is used for providing pressure liquid and pore water to the triaxial pressure chamber to generate the aforementioned axial pressure, confining pressure and seepage field, and for independently and accurately controlling the values of the axial pressure, confining pressure and seepage field; a signal acquisition device, which is used for monitoring the deformation and seepage process of the model during the test;

during the simulation test, the triaxial pressure chamber is placed on the supergravity centrifuge, and the centrifugal acceleration generated by the supergravity centrifuge is n times of the gravity acceleration g (n is an integer greater than 1), so that the model is in the supergravity state.

Preferably, n is an integer greater than or equal to 100.

Where, the supergravity centrifuge rotates with a constant angular velocity $\omega$, and the provided centrifugal acceleration is equal to $r\omega^2$ (r is the distance from any point in the model to the rotation center). If the model is made of the same material as the prototype, then when the centrifugal acceleration is n times of the gravity acceleration ($ng=nr\omega^2$), the research object at the depth hm of the model will have the same vertical stress as the research object at the depth hp=nhm of the prototype $\sigma m=\sigma p$. This is the most basic similarity ratio principle of supergravity centrifugal simulation, that is, the stress field of the model is the in-situ stress field when the model with n times smaller dimensions is subjected to n times the gravity acceleration. For example, when n=10, that is, the acceleration is 10 g, the stress level at 1 m depth in the model is the same as that at 10 m depth in the prototype; when n=100, that is, the acceleration is 100 g, the stress level at the depth of 1 m in the model is the same as that at 100 m in the prototype.

The above technical solution can be further improved by the following technical measures:

Preferably, the triaxial pressure chamber comprises four channels, which are axial pressure channel, confining pressure channel, pore water inlet channel and pore water outlet channel.

Preferably, the simulation control device comprises a main control unit, a pressure seepage control unit, a data feedback unit and a source sink unit. The pressure seepage control unit comprises four units, which are axial pressure control unit, confining pressure control unit, pore water inlet control unit and pore water outlet control unit.

Preferably, the data feedback unit is used to collect the axial pressure, confining pressure and pore pressure in the triaxial pressure chamber during the simulation process, and transmit the collected data to the main control unit.

Preferably, the axial pressure control unit is connected with the axial pressure channel to control the axial pressure in the triaxial pressure chamber; the confining pressure control unit is connected with the confining pressure channel to control the confining pressure in the triaxial pressure chamber; the pore water inlet control unit is connected with the pore water inlet channel, and the pore water outlet control unit is connected with the pore water outlet channel, both of which constitute the pressure difference of pore water at the inlet and outlet, which is used to control the seepage field in the triaxial pressure chamber.

Preferably, the data feedback unit is used to collect the axial pressure, the confining pressure and the pore pressure in the triaxial pressure chamber during the simulation, and transmit the collected data to the main control unit.

Preferably, the source sink unit is used to provide pressure liquid and/or pore water to the pressure seepage control unit.

Preferably, the pressure seepage control unit comprises a pressure seepage controller and a pressure seepage regulator; after receiving the pressure liquid or pore water output from the source sink unit, the pressure seepage regulator monitors the flow of the pressure liquid and outputs it to the main control unit, and dynamically adjusts the flow of the pressure liquid output by the pressure seepage controller according to the feedback of the main control unit.

Preferably, the pressure seepage controller comprises a driving component, a liquid storage component, a control component and an output component, the driving component being used to convert the thrust of the pressure liquid output by the source sink unit on itself into the thrust of itself on the liquid storage component, the liquid storage component being a container for storing pressure liquid or pore water, the liquid in the container not being connected with the liquid output from the source sink unit, the liquid storage component transmitting the liquid therein to the output component through the pipeline after receiving the thrust from the driving component, the control component being connected with the pressure seepage regulator to control the flow of the liquid input to the driving component, and the output component being connected with the liquid storage component to output the pressure liquid or pore water in the liquid storage component to the triaxial pressure chamber.

Preferably, the signal acquisition device comprises sensors, such as displacement, deformation, humidity, and so on, which are used to monitor the deformation and seepage process of the sample during the test.

Preferably, the triaxial pressure chamber further comprises an axial pressure simulation component, a confining pressure simulation component and a seepage simulation component. The axial pressure simulation component is connected with the axial pressure channel, which comprises a pair of axial pressure indenters located at the top and bottom of the model in the triaxial pressure chamber, and one of the indenters is fixed and the other indenter can move up and down to exert axial pressure on the model driven by the pressure liquid.

Preferably, the confining pressure simulation component is connected with the confining pressure channel, which guides the pressure liquid output from the channel into the triaxial pressure chamber to generate the confining pressure on the model by the liquid surrounding the model.

Preferably, the seepage simulation component is connected with the pore water inlet channel and the pore water outlet channel to guide the pore water output from the pore water inlet channel to flow into the model after being through the perforated plate contacted at one end of the model and then into the interior of the model, and then flows out from the perforated plate contacted at the other end of the model and then flow into the pore water outlet channel, so as to generate the in-situ pore water pressure difference of the model, thus forming the in-situ seepage field.

Preferably, the perforated plate is a waterproof plate with the same shape as the bottom of the model, on which circular holes are arranged, and the distribution density of the holes is more than or equal to 30, and the outer sides of the model and the perforated plates are wrapped with impermeable rubber film, so that they are in the same closed cavity, and the impermeable rubber film is only provided with a pore water inlet and a pore water outlet, so that the pore water forms a seepage field inside the model.

As a result of the above technical measures, the present disclosure has beneficial effects as follows:

The test device can simulate the self-weight stress field gradient and confining pressure gradient through the supergravity centrifuge, and simulate the confining pressure, axial pressure and pore water flow through the pressure seepage control unit, which can ensure that the stress field and seepage field of the model are in-situ stress field and seepage field, and improve the similarity, reliability and accuracy of the simulation test.

The pressure seepage control unit comprises four units in the test device, which are axial pressure control unit, confining pressure control unit, pore water inlet control unit and pore water outlet control unit; each unit includes a pressure seepage controller and a pressure seepage regulator, which can receive the pressure feedback from the main control unit, so as to adjust the output pressure of the pressure seepage controller, and it can output the pressure with an accuracy of 1% or form the pore water pressure difference with an accuracy of 1% to the triaxial pressure chamber through the command of the control unit.

Figure 1:
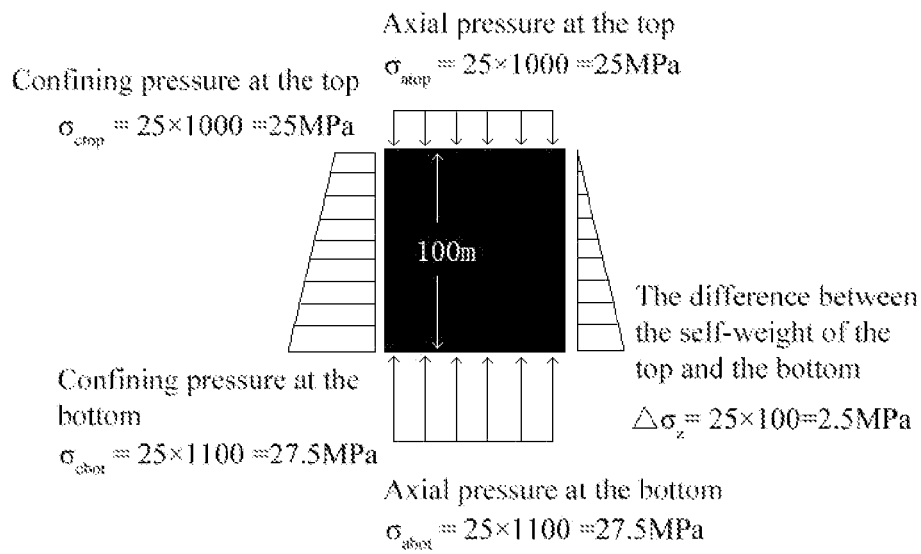
FIG. 1 is the force analysis diagram of the rock prototype in deep earth engineering.

The accompanying drawings are marked as below:

1—supergravity centrifuge; 2—triaxial pressure chamber; 2011—upper indenter; 2012—lower indenter; 2013—axial pressure channel; 2021—confining pressure channel; 2031—pore water inlet channel; 2032—pore water outlet channel; 204—lower perforated plate; 205—upper perforated plate; 206—signal acquisition device; 2061—signal acquisition channel; 5—main control unit; 601—axial pressure control unit; 6011—axial pressure controller; 6012—axial pressure regulator; 602—confining pressure control unit; 6021—confining pressure controller; 6022—confining pressure regulator; 603—pore water inlet control unit; 6031—pore water inlet controller; 6032—pore water inlet regulator; 604—pore water outlet control unit; 6041—pore water outlet controller; 6042—pore water outlet regulator; 7—data feedback unit; 8—source sink unit; 9—pipeline; 10—model.

DETAILED DESCRIPTION OF THE EMBODIMENTS

Hereinafter, the present disclosure will be further described in detail in combination with the accompanying drawings and the embodiments. The following embodiments are intended only to illustrate the present disclosure and are not intended to limit the scope of the present disclosure. In addition, it should be understood that after reading what is taught in the present disclosure, those skilled in the art can make various changes or modifications to the disclosure, and these equivalent forms also fall within the scope of protection of the present disclosure.

By taking a deep geological disposal repository as an example, the necessity and superiority of the present system are introduced.

In the present disclosure, deep geological disposal repository refers to a device for storing high-level radioactive waste underground at a distance of 500 m to 1000 m from the surface of the ground. High level radioactive waste (HLW) refers to the radioactive waste with high content or concentration of radionuclides, high heat release and requires special shielding during operation and transportation.

The basic principle of deep geological disposal of high-level radioactive waste is to build a repository for storing nuclear waste hundreds of meters underground, and to ensure that nuclear waste will not cause harm to the surface biosphere for tens of thousands or even millions of years through a multiple-barrier system formed by engineering barriers and geological barriers. The high-level radioactive waste is sealed in metal disposal tanks, which are placed inside the disposal repository and buffer material is used to fill between the disposal tanks and the surrounding rocks. The buffer material is usually made of high-pressure compacted bentonite, which will expand when it meets water and can support the surrounding rocks, while at the same time the bentonite also has a good barrier effect on nuclides.

High level radioactive waste can be permanently isolated from human living environment by burying it in deep repository. The specific method of disposal of high-level radioactive waste in deep geological disposal repository is: the high-level radioactive waste is processed into glass-cured body and sealed in metal packaging container, which is called disposal tank. A repository contains multiple disposal tanks. Before the construction of the repository, it is necessary to excavate the cave in the deep rock mass, fill a buffer barrier inside the cave, and build the repository in the buffer barrier. The surrounding rocks of the repository include granite, clay rock, tuff and rock salt and so on, and the wastes to be disposed of are high-level radioactive waste (HLW), glass-cured waste, spent fuel and α waste, etc. Deep geological disposal of radioactive waste is a complex system engineering. Technically, it includes site selection and site evaluation, construction of underground laboratories, and design, construction, operation and closure of repository. Deep geological disposal is considered to be the most practical and feasible method for safe disposal of high-level radioactive waste.

In this regard, glass-cured waste, metal packaging containers, buffer barriers and surrounding rock together constitute the near field of deep geological disposal repository. The water-force multi-field interaction in the near field of the deep repository can last for hundreds or even thousands of years. Water-force multi-field interaction refers to the coupling of seepage process and deformation process, which is caused due to: deformation will change the void ratio of material, resulting in the change of permeability coefficient; the seepage will change the saturation of the material, resulting in the change of strength parameters. The repository is usually located in the groundwater saturation zone. At the initial stage after the closure of the repository, the interior of the repository is in an unsaturated state, and groundwater will gradually infiltrate to re-saturate it, a process called re-saturation. During re-saturation process, the high-level radioactive waste in the disposal tank will continue to release heat due to the decay reaction, and the accumulation of heat will cause the surface temperature of the disposal tank to rise. In the repository, multiple physical processes of heat conduction, groundwater seepage, water vapor migration, buffer material expansion and surrounding rock deformation interact at the same time. In this process, the engineering characteristics of buffer material and surrounding rocks will change due to the changes of stress, pore pressure, saturation and temperature, which will further affect the re-saturation process.

In the deep earth disposal project of high-level radioactive waste, when the repository is re-saturated, the groundwater gradually corrodes the metal disposal tank, and finally enters the disposal tank to contact with the nuclear waste. At this time, the nuclides in the nuclear waste dissolve in the groundwater and migrate outward, and enter the surface biosphere through engineering barriers and geological barriers. The time required for the re-saturation process after the closure of the repository is one of the questions that must be answered in the safety assessment of the repository, where the re-saturation process takes about 100 years. On the one hand, the state after re-saturation directly affects the source strength and boundary conditions when nuclides migrate in the near field and far field; on the other hand, the characteristics of seepage, mechanics and solute migration in the near field of the repository after the combined heat-water-force effect have an important impact on the safety assessment of the repository. Therefore, it is particularly important to study re-saturation process of the repository in the near field of the repository at the centennial scale.

Embodiment 1

Figure 2:
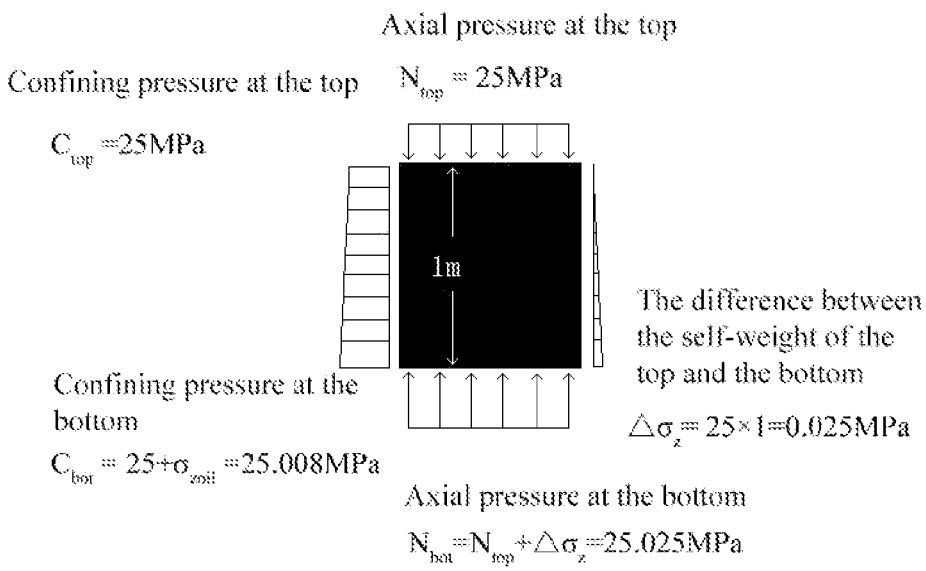
FIG. 2 is the force analysis diagram of the model in a simulation test under normal gravity.
Figure 3:
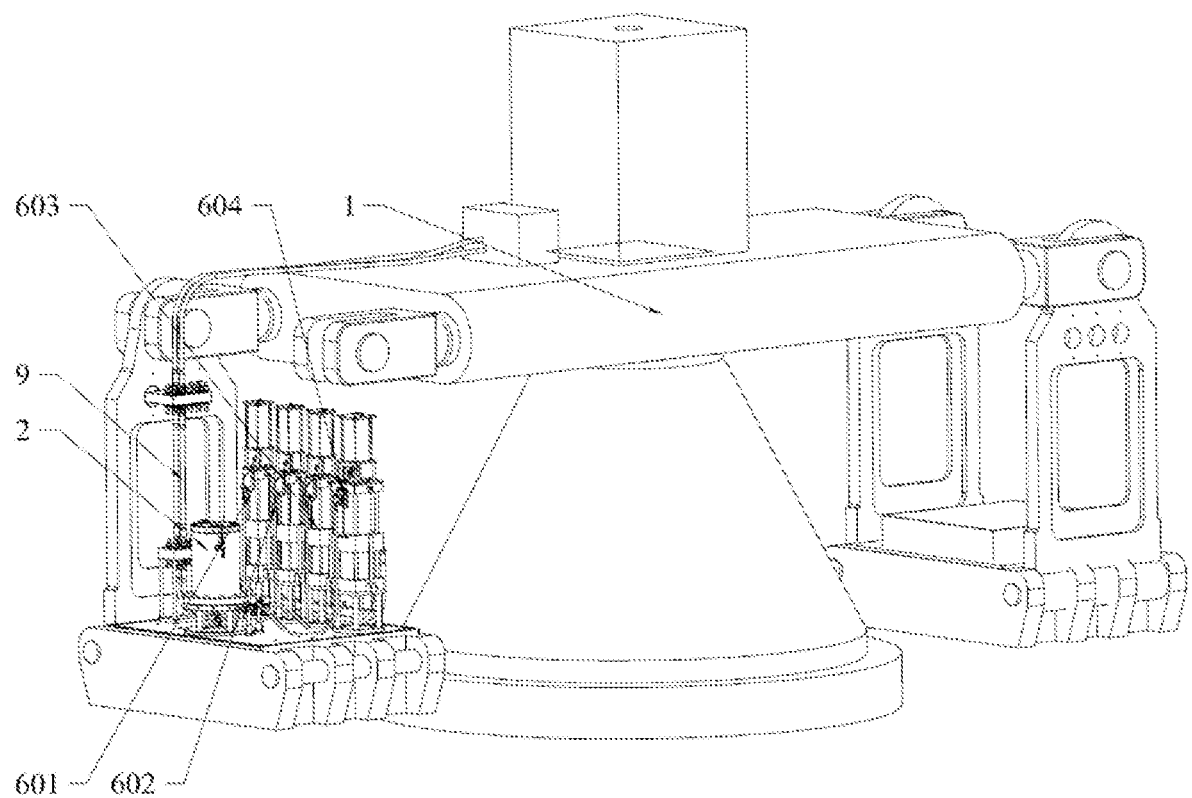
FIG. 3 is an overall schematic diagram according to the first embodiment of the present disclosure.
Figure 4:
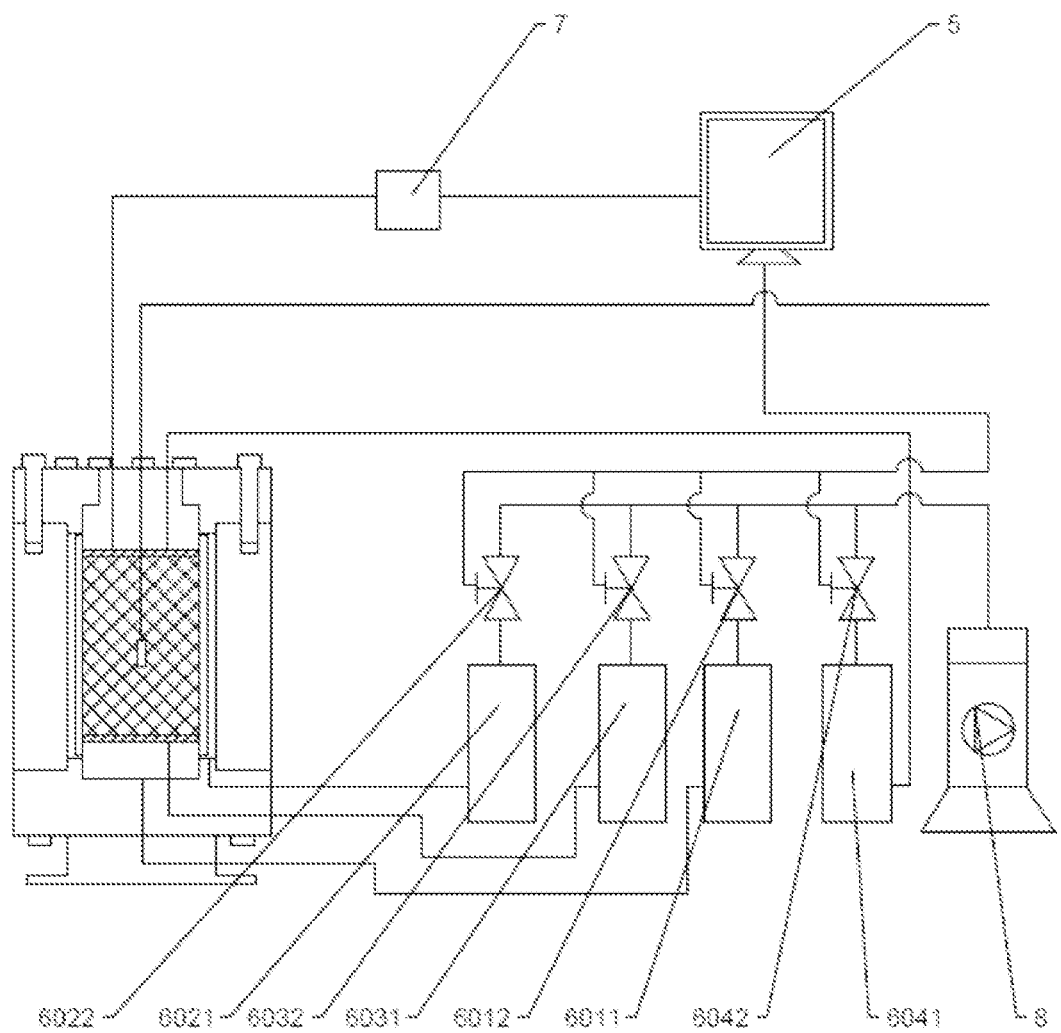
FIG. 4 is a schematic diagram of the control principle according to the first embodiment of the present disclosure.
Figure 5:
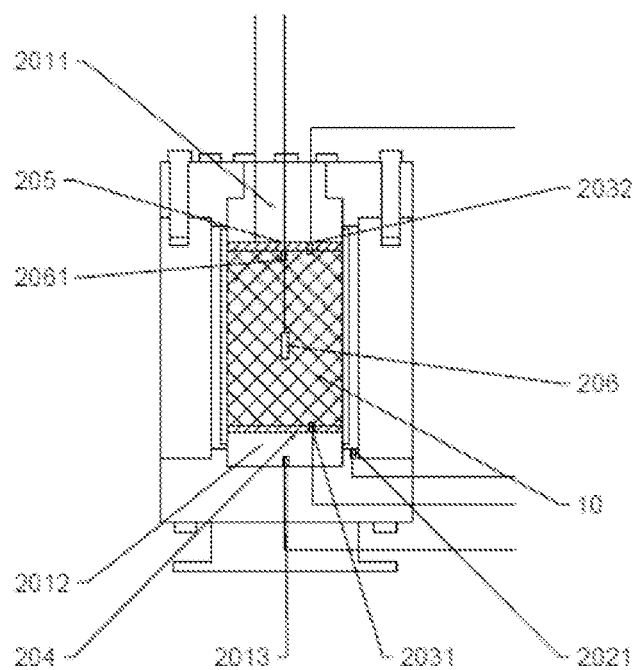
FIG. 5 is a schematic diagram of the structure of the triaxial pressure chamber according to the first embodiment of the present disclosure.

As shown in FIG. 2 to FIG. 4, a supergravity simulation system for in-situ stress field and seepage field of deep earth engineering in this embodiment, comprises: a supergravity centrifuge 1 for generating centrifugal acceleration, a triaxial pressure chamber 2 for placing a model, a signal acquisition device 206 for monitoring the deformation and seepage process of the model during the test, and a simulation control device for providing pressure liquid and pore water to the triaxial pressure chamber to generate the aforementioned axial pressure, confining pressure and seepage field, and controlling the values of the axial pressure, confining pressure and seepage field; the supergravity centrifuge can generate centrifugal acceleration n times the gravity acceleration, and n is greater than 1 to generate the supergravity acceleration, generally n is greater than or equal to 100 to generate supergravity acceleration; the triaxial pressure chamber 2 is provided with four channels, the four channels being axial pressure channel 2013, confining pressure channel 2021, pore water inlet channel 2031 and pore water outlet channel 2032; the triaxial pressure chamber 2 is an existing triaxial pressure chamber. The simulation control device comprises a main control unit 5, a pressure seepage control unit, a data feedback unit 7 and a source sink unit 8; the pressure seepage control unit 6 comprises four units, namely axial pressure control unit 601, confining pressure control unit 602, pore water inlet control unit 603 and pore water outlet control unit 604; the axial pressure control unit 601 is connected with the axial pressure channel 2013 to control the axial pressure in the triaxial pressure chamber 2; the confining pressure control unit 602 corresponds to the confining pressure channel 2021 to control the confining pressure in the triaxial pressure chamber 2; the pore water inlet control unit 603 corresponds to the pore water inlet channel 2031, and the pore water outlet control unit 604 corresponds to the pore water outlet channel 2032, both of which constitute the pressure difference between pore water at the inlet and outlet for controlling the seepage field in the triaxial pressure chamber 2; the data feedback unit 7 is used to collect the axial pressure, confining pressure and pore water flow output from the pressure seepage control unit to the triaxial pressure chamber in the simulation process, and transmit the collected data to the main control unit 5; the source sink unit 8 is used for providing pressure liquid and/or pore water to the pressure seepage control unit 6; the simulation system simulates the confining pressure and gravity stress field having gradients through the supergravity acceleration generated by the operation of the supergravity centrifuge 1, and simulates the prototype in-situ seepage field through the pressure seepage control unit 6.

In this embodiment, as shown in FIG. 2, the supergravity centrifuge 1 comprises a rotating arm and a hanging basket, the triaxial pressure chamber 2 is placed on the hanging basket, and the simulation control device comprises a main control unit 5, a pressure seepage control unit 6, a data feedback unit 7 and a source sink unit 8; the pressure and seepage control units comprises four units, namely axial pressure control unit 601, confining pressure control unit 602, pore water inlet control unit 603 and pore water outlet control unit 604. The model 10 used to simulate the deep repository is placed in the triaxial pressure chamber 2; the source sink unit 8 is connected to the triaxial pressure chamber 2 through a pipeline 9 and a pressure seepage control unit 6; the pressure seepage control unit 6 and the data feedback unit 7 are all connected with the main control unit 5 and the triaxial pressure chamber 2, and the triaxial pressure chamber 2 and the pressure seepage control unit 6 are arranged in the hanging basket; the data feedback unit 7 and the main control unit 5 are arranged in the center of the rotating arm; the source sink unit 8 is arranged outside the supergravity centrifuge 1.

In this embodiment, the pressure seepage control unit 6 comprises a pressure seepage controller and a pressure seepage regulator, more specifically, comprises an axial pressure controller 6011, an axial pressure regulator 6012, a confining pressure controller 6021, a confining pressure regulator 6022, a pore water inlet controller 6031, a pore water inlet regulator 6032, a pore water outlet controller 6041, and pore water outlet regulator 6042. The axial pressure controller 6011, the confining pressure controller 6021, the pore water inlet controller 6031 and the pore water outlet controller 6041 are collectively referred to as pressure seepage controllers. The axial pressure regulator 6012, the confining pressure regulator 6022, the pore water inlet regulator 6032 and the pore water outlet regulator 6042 are collectively referred to as pressure seepage regulators. The pressure seepage regulator adjusts the output pressure or the output pore water flow of the pressure seepage controller according to the pressure feedback signal received form the output of the main control unit 5.

In this embodiment, the pressure seepage controller comprises driving component, liquid storage component, control component and output component, the driving component being used to convert the thrust of the pressure liquid output by the source sink unit 8 on itself into the thrust of itself on the liquid storage component, the liquid storage component being a container for storing pressure liquid or pore water, the liquid in the container not being connected with the liquid output from the source sink unit 8, the liquid storage component transmitting the liquid therein to the output component through the pipeline after receiving the thrust from the drive component, the control component being connected with the pressure seepage regulator to control the flow of the liquid input into the drive component, and the output component being connected with the liquid storage component to output the pressure liquid or pore water in the liquid storage component to the triaxial pressure chamber 2.

In this embodiment, the pressure seepage regulator has a dynamic adjustment function, which is that after receiving the pressure liquid or pore water output from the source sink unit 8, it can dynamically adjust the flow rate of liquid output from the input pressure seepage controller according to the pressure feedback from the main control unit 5.

In this embodiment, the triaxial pressure chamber 2 also comprises an axial pressure simulation component, a confining pressure simulation component and a seepage simulation component, the axial pressure simulation component being a pair of axial pressure indenters located at the top and bottom of the triaxial pressure chamber model, in which the upper indenter 2011 is fixed, the lower indenter 2012 can move up and down and is connected with the axial pressure channel 2013, the lower indenter 2012 applying axial pressure on the model 10 driven by the pressure liquid; the confining pressure simulation component being connected with the confining pressure channel 2021 to guide the pressure liquid output from the channel into the cavity of the triaxial pressure chamber 2, and generate the surrounding pressure through the liquid surrounding the model 10; the seepage simulation component being connected with the pore water inlet channel 2031 and the pore water outlet channel 2032, guiding the pore water output from the pore water inlet channel 2031 to flow into the model 10 after being through the perforated plate 204 at the bottom of the model 10, and then flow out from the pore water outlet channel 2032 after being through the perforated plate 205 at the top of the model 10, so that the top and bottom surfaces of the model 10 have the same seepage boundary as the actual situation, thus forming a seepage field which is the same as the actual situation.

In this embodiment, the lower perforated plate 204 and the upper perforated plate 205 are waterproof plates with the same radius as the model, on which circular holes are uniformly distributed, and the number of holes is 30.

Triaxial pressure chamber 2 is a high strength alloy steel cylindrical triaxial pressure chamber with a pressure resistance range of 10-50 MPa, with the inner chamber size larger than 200 mm×200 mm, and the strength empirical calculation to work normally within the centrifugal acceleration range of 50-300 g.

The triaxial pressure chamber 2 is provided with a deep geological disposal repository model 10; the top of the cavity of the triaxial pressure chamber 2 is provided with the perforated plate 205, which is connected with the pore water outlet channel 2032, and the bottom is provided with a perforated plate 204, which is connected with the pore water inlet channel 2031; the outer bottom of the triaxial pressure chamber 2 is provided with an axial pressure channel 2013 and a confining pressure channel 2021; the triaxial pressure chamber 2 is provided with an upper indenter 2011 and a lower indenter 2012.

After the model 10 is placed into the triaxial pressure chamber 2, pore water is injected through the pore water inlet channel 2031 and the pore water outlet channel 2032 to simulate the formed seepage field; the pressure liquid is injected through the axial pressure channel 2013, and the lower indenter 2012 moves upward under the action of the pressure liquid and squeeze the model 10 to simulate the axial pressure; the pressure liquid is injected through the confining pressure channel 2021, and the pressure liquid surrounds and squeeze the model 10 to simulate the confining pressure.

A signal acquisition device 206 is provided in the triaxial pressure chamber, specifically comprising displacement, deformation and humidity sensors for monitoring the deformation and seepage process of the sample during the test; the signal acquisition device 206 is placed inside the triaxial pressure chamber 2 and transmits the data to the processor outside the system through the sensor channel 2061.

The pressure control module servo-controls the axial pressure of 25 MPa, confining pressure of 25 MPa and pore water pressure of 10 MPa to simulate the actual vertical and horizontal stress fields and seepage fields of deep earth environment.

The simulation system of the disclosure relies on the supergravity field generated by the supergravity centrifuge, and enables the devices inside the centrifuge to simulate the multi-field interaction process of deep earth engineering through the pressure seepage control unit; the supergravity field generated by the supergravity centrifuge compensates for the self-weight loss caused by the scale-down effect, and the simulation prototype has a self-weight stress field; furthermore, due to the distances from each point on the model to the centrifuge spindle are different, under the ng centrifugal acceleration based on the bottom of the model, if the distance from the bottom of the model to the centrifuge spindle is R and the distance from the top of the model to the centrifuge spindle is r, then the angular velocity of the centrifuge rotation is $ng/R^2$, and the centrifugal acceleration at the top of the model is $ngr^2/R^2$, and if the bulk density of the system is $\gamma$, then the self-weight stress gradient simulated by the system is $\gamma ng(R+r)/R^2$; the control unit applies axial pressure on the model to simulate the vertical stress field of the prototype; the control unit applies confining pressure to the model to simulate the horizontal stress field of the prototype; the seepage control unit applies pore pressure to the model to simulate the prototype seepage process; the time-lapse effect of the centrifuge reproduces the changes of the stress field and seepage field of the prototype for a long time (thousand years or even ten thousand years). Among them, the scale-down effect of the centrifuge refers to that under the centrifugal acceleration of ng, the size of the model used in the test is 1/n of that of the prototype; the time-lapse effect of centrifuge refers to that when the dynamic process of the model used in the test reaches the same effect as the prototype under the centrifugal acceleration of ng, the time taken is 1/n of the duration of the prototype process.

The specific working process of the present disclosure is as follows:

Place the triaxial pressure chamber 2 configured with deep geological disposal repository, buffer barrier and surrounding rock model 10 on the basket of the supergravity centrifuge 1, and connect the relevant pipeline 9 of the pressure seepage control device 6 with the triaxial pressure chamber 2; inject pore water and pressure liquid into the pressure seepage control device 6 through the source sink unit 8, and connect the sensor channel 2061 with the signal acquisition device 206.

Turn on the high gravity centrifuge 1 after setting, and the centrifugal acceleration gradually increases from 1 g to 100 g. During the acceleration process, the flow of pressure liquid and pore water input into the triaxial pressure chamber 2 is monitored in real time through the data feedback unit 7 in the simulation control device and fed back to the main control unit 5 in real time; the flow of pressure liquid and pore water input from the source sink unit 8 is monitored in real time when passing through the pressure seepage control unit and fed back to the main control unit 5, and the input and output liquid flow is adjusted according to the command issued by the main control unit 5. The data of the signal acquisition device 206 is output to a processor outside the system.

After the centrifugal acceleration required by the test is reached, the signal acquisition device 206 starts to monitor the pressure, displacement and seepage for a long time.

After the end of the test, turn off the centrifuge, and gradually reduce the centrifugal acceleration to 1 g, and take out the triaxial pressure chamber 2 to treat the model 10. The processor outside the system collates the data collected during the whole process of the test for subsequent analysis.

In this embodiment, by comparing the measurement of the pressure and flow sensors with the preset pressure and flow value of the host, the output control accuracy of axial pressure, confining pressure and pore water pressure difference reaches 1%.

This specification lists only the better embodiment of the present disclosure, and any equivalent technical exchanges under the working principle and idea of the present disclosure are considered as the scope of protection of the present disclosure.

What is claimed is:

1. A supergravity simulation system for in-situ stress field and seepage field of deep earth engineering, comprising:
   a triaxial pressure chamber, configured to receive a model and provide an in-situ axial pressure and a confining pressure of a deep earth structure and the seepage field in which the deep earth structure is located;
   a simulation control device, configured for providing a pressure liquid and a pore water to the triaxial pressure chamber to generate the axial pressure, confining pressure and seepage field, and controlling values of the axial pressure, confining pressure and seepage field; the simulation control device comprises a main control unit, a pressure seepage control unit, a data feedback unit and a source sink unit;
   a signal acquisition device, configured to monitor a deformation and a seepage process of the model during simulation test;
   the triaxial pressure chamber and the simulation control device are placed on a supergravity centrifuge, and a centrifugal acceleration generated by the supergravity centrifuge is n times of gravity acceleration g (n is an integer greater than 1) to make the model in a supergravity state for generating a geostatic stress with gradient, and make the confining pressure liquid is in the state of supergravity for generating a confining pressure with gradient.

2. The supergravity simulation system for in-situ stress field and seepage field of deep earth engineering according to claim 1, wherein the triaxial pressure chamber comprises four channels, including an axial pressure channel, a confining pressure channel, a pore water inlet channel and a pore water outlet channel.

3. The supergravity simulation system for in-situ stress field and seepage field of deep earth engineering according to claim 1, wherein the pressure seepage control unit comprises four units, including an axial pressure control unit, a confining pressure control unit, a pore water inlet control unit and a pore water outlet control unit; the axial pressure control unit, the confining pressure control unit, the pore water inlet control unit and the pore water outlet control unit allows the axial pressure, confining pressure and seepage field of the model to be controlled independently.

4. The supergravity simulation system for in-situ stress field and seepage field of deep earth engineering according to claim 3, wherein the axial pressure control unit is connected with the axial pressure channel to control the axial pressure in the triaxial pressure chamber;

the confining pressure control unit is connected with the confining pressure channel to control the confining pressure in the triaxial pressure chamber;

the pore water inlet control unit is connected with the pore water inlet channel, and the pore water outlet control unit is connected with the pore water outlet channel, both of which constitute a pressure difference of pore water at the inlet and outlet, which is used to control the seepage field in the triaxial pressure chamber.

5. The supergravity simulation system for in-situ stress field and seepage field of deep earth engineering according to claim 1, wherein the data feedback unit is configured to collect the axial pressure, confining pressure and pore water flow output from the pressure seepage control unit to the triaxial pressure chamber in the simulation process, and transmit the collected data to the main control unit.

6. The supergravity simulation system for in-situ stress field and seepage field of deep earth engineering according to claim 1, wherein the source sink unit is used for providing pressure liquid and/or pore water to the pressure seepage control unit.

7. The supergravity simulation system for in-situ stress field and seepage field of deep earth engineering according to claim 6, wherein the pressure seepage control unit comprises a pressure seepage controller and a pressure seepage regulator; the pressure seepage regulator is configured to monitor a flow of the liquid and output the flow to the main control unit after receiving the pressure liquid or pore water output from the source sink unit; and the pressure seepage regulator is further configured to dynamically adjust an output liquid flow of the pressure seepage controller according to the feedback of the main control unit.

8. The supergravity simulation system for in-situ stress field and seepage field of deep earth engineering according to claim 7, wherein the pressure seepage controller comprises a driving component, a liquid storage component, a control component and an output component; wherein the driving component is configured to convert a first thrust of the pressure liquid output by the source sink unit on the driving component into a second thrust of the driving component on the liquid storage component; the liquid storage component is a container for storing pressure liquid or pore water, the liquid in the container not being in communication with the liquid output from the source sink unit; the liquid storage component is configured to transmit the liquid therein to the output component through a pipeline after receiving the second thrust from the driving component; the control component is connected with the pressure seepage regulator to control the flow of the liquid input to the driving component; and the output component is connected with the liquid storage component to output the pressure liquid or pore water in the liquid storage component to the triaxial pressure chamber.

9. The supergravity simulation system for in-situ stress field and seepage field of deep earth engineering according to claim 1, wherein the signal acquisition device comprises displacement sensors, deformation sensors, humidity sensors for monitoring the deformation and seepage process of the sample during the test.

10. The supergravity simulation system for in-situ stress field and seepage field of deep earth engineering according to claim 2, wherein the triaxial pressure chamber further comprises an axial pressure simulation component, a confining pressure simulation component and a seepage simulation component.

11. The supergravity simulation system for in-situ stress field and seepage field of deep earth engineering according to claim 10, wherein the axial pressure simulation component is connected with the axial pressure channel, and the axial pressure simulation component comprises a pair of axial pressure indenters located at the top and bottom of the model in the triaxial pressure chamber, where one of the indenters is fixed, and the other indenter is movable in up and down directions to exert an axial pressure on the model driven by the pressure liquid.

12. The supergravity simulation system for in-situ stress field and seepage field of deep earth engineering according to claim 10, wherein the confining pressure simulation component is connected with the confining pressure channel to guide the pressure liquid output from the confining pressure channel into the triaxial pressure chamber, and generate the surrounding pressure through the liquid surrounding the model.

13. The supergravity simulation system for in-situ stress field and seepage field of deep earth engineering according to claim 10, wherein the seepage simulation component is connected with the pore water inlet channel and the pore water outlet channel to guide the pore water output from the pore water inlet channel to flow through a perforated plate contacted at one end of the model and then into the model, and then flow out from the perforated plate contacted by the other end of the model and then flows into the pore water outlet channel, resulting in the in-situ pore water pressure difference of the model, thus forming the in-situ seepage field.

14. The supergravity simulation system for in-situ stress field and seepage field of deep earth engineering according to claim 13, wherein the perforated plate is a waterproof plate with the same shape as the bottom of the model, on which circular holes are arranged; a distribution density of circular holes is greater than or equal to 30; the outer side of the model and the perforated plates are wrapped with an impermeable rubber film, so that the model and the perforated plate are enclosed in a closed cavity; the impermeable rubber film is only provided with a pore water inlet and outlet, so that the pore water forms a seepage field inside the model.

* * * * *